United States Patent
Yoon et al.

(10) Patent No.: US 9,618,682 B2
(45) Date of Patent: Apr. 11, 2017

(54) OPTICAL SHEET AND BACKLIGHT UNIT AND DISPLAY DEVICE COMPRISING THE SAME

(71) Applicant: LG DISPLAY CO., LTD., Seoul (KR)

(72) Inventors: Hyeokjoon Yoon, Chilgok-gun (KR); Youngwoong Kim, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 249 days.

(21) Appl. No.: 14/137,684

(22) Filed: Dec. 20, 2013

(65) Prior Publication Data

US 2015/0062493 A1    Mar. 5, 2015

(30) Foreign Application Priority Data

Aug. 30, 2013 (KR) .................. 10-2013-0104353

(51) Int. Cl.
- *G02F 1/1335* (2006.01)
- *F21V 8/00* (2006.01)
- *G02B 5/04* (2006.01)

(52) U.S. Cl.
CPC ........... *G02B 6/0053* (2013.01); *G02B 5/045* (2013.01); *G02F 2001/133607* (2013.01)

(58) Field of Classification Search
CPC ... G02F 2001/133607; G02F 1/133615; G02F 1/133606; G02B 6/0001; G02B 5/04; G02B 5/045; G02B 6/0053
USPC ...................................................... 349/64, 65
See application file for complete search history.

(56) References Cited

U.S. PATENT DOCUMENTS

| | | |
|---|---|---|
| 2005/0275767 A1 | 12/2005 | Huang et al. |
| 2006/0114567 A1* | 6/2006 | Shim .................... G02B 5/0231 359/586 |
| 2007/0053206 A1 | 3/2007 | Yamashita et al. |
| 2009/0322988 A1* | 12/2009 | Kim et al. ..................... 349/65 |
| 2010/0053502 A1* | 3/2010 | Kim et al. ..................... 349/64 |

FOREIGN PATENT DOCUMENTS

| | | |
|---|---|---|
| CN | 1396483 A | 2/2003 |
| CN | 1816719 A | 8/2006 |
| CN | 101614910 A | 12/2009 |
| CN | 101661188 A | 3/2010 |

\* cited by examiner

*Primary Examiner* — Nathanael R Briggs
*Assistant Examiner* — William Peterson
(74) *Attorney, Agent, or Firm* — Birch, Stewart, Kolasch & Birch, LLP

(57) ABSTRACT

An optical sheet, a backlight unit having the optical sheet, and a display device having the backlight unit are discussed. According to an embodiment, the optical sheet includes a base film; a high refractive index layer having a plurality of prism portions on the base film; and a low refractive index layer positioned on the high refractive index layer, and covering the plurality of prism portions and having a surface parallel to the base film, each of the prism portions including an incidence surface on which incident light is refracted and a reflective surface on which the refracted light is reflected, the incidence surface including a bent for refracting the incident light towards the reflective surface.

19 Claims, 10 Drawing Sheets

US 9,618,682 B2

OPTICAL SHEET AND BACKLIGHT UNIT AND DISPLAY DEVICE COMPRISING THE SAME

This application claims the priority benefit of Korean Patent Application No. 10-2013-0104353 filed on Aug. 30, 2013, which is incorporated herein by reference for all purposes as if fully set forth herein.

BACKGROUND OF THE INVENTION

Field of the Invention

Embodiments of the invention relate to an optical sheet, and more particularly, to an optical sheet which improves luminance and a backlight unit and display device comprising the same.

Discussion of the Related Art

In recent years, the field of displays for visually expressing various kinds of electric signal information is developing rapidly. In line with this, a variety of flat panel displays (FPDs) having excellent characteristics such as thin profile, lightness in weight, and low power consumption have been introduced and are rapidly replacing conventional cathode ray tubes (CRTs).

Examples of flat panel displays include a liquid crystal display (LCD), a plasma display panel (PDP), a field emission display (FED), and an electroluminescence display (ELD). The liquid crystal display is most actively used in the field of display screens for laptops, monitors, and TVs because of its high contrast ratio and excellent display characteristics of a moving picture.

The liquid crystal display may be generally classified as a light receiving display. The liquid crystal display comprises a liquid crystal display panel displaying an image and a backlight unit that is positioned under the liquid crystal display panel to provide the liquid crystal display panel with light. The backlight unit may comprise a light source, a light guide plate for propagating the light provided from the light source towards the display panel, and an optical sheet. Here, the optical sheet may comprise a diffusion sheet for diffusing and focusing light and a prism sheet. The light emitted from the light source in the conventional backlight unit having the above configuration may be focused by the prism sheet.

FIG. 1 is a view schematically showing the focusing of light incident on a prism sheet in a backlight unit of a liquid crystal display according to a related art. Referring to FIG. 1, when light is incident on a prism sheet made up of a base film 10 and a plurality of prisms 20, the light travels, and is refracted at a certain angle due to a refractive index difference between an air layer and the incidence plane of the prism 20. The prisms 20 have an angle θ2 of the incidence surface. The light touching the reflective surface is reflected upward or substantially vertically from the prism sheet and contributes to luminance. In contrast, the light not touching the reflective surface is directed toward a side of the prism sheet and causes light loss. Accordingly, the luminance of the light provided from the backlight unit is lowered, and therefore the overall luminance of the display device may be lowered.

SUMMARY OF THE INVENTION

Embodiments of the invention provide an optical sheet which improves luminance, and a backlight unit and display device including the same.

In one aspect of the present invention, there is an optical sheet including a base film, a high refractive index layer having a plurality of prism portions on the base film, and a low refractive index layer positioned on the high refractive index layer, and covering the plurality of prism portions and having a surface parallel to the base film, the prism portions each including an incidence surface where light is incident and a reflective surface where incident light is reflected, the incidence surface being refracted at a certain point.

In another aspect of the present invention, there is a backlight unit including a light guide plate positioned on the side of the light source, a reflective plate positioned under the light guide plate, and an optical sheet positioned on the light guide plate, the optical sheet including a base film, a high refractive index layer having a plurality of prism portions on the base film, and a low refractive index layer positioned on the high refractive index layer, and covering the plurality of prism portions and having a surface parallel to the base film, the prism portions each including an incidence surface where light is incident and a reflective surface where incident light is reflected, the incidence surface being refracted at a certain point.

In another aspect of the present invention, there is a liquid crystal display including a light guide plate positioned on the side of the light source, a reflective plate positioned under the light guide plate, an optical sheet positioned on the light guide plate, and a liquid crystal panel positioned on the optical sheet, the optical sheet including a base film, a high refractive index layer having a plurality of prism portions on the base film, and a low refractive index layer positioned on the high refractive index layer, and covering the plurality of prism portions and having a surface parallel to the base film, the prism portions each including an incidence surface where light is incident and a reflective surface where incident light is reflected, the incidence surface being refracted at a certain point.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 2:
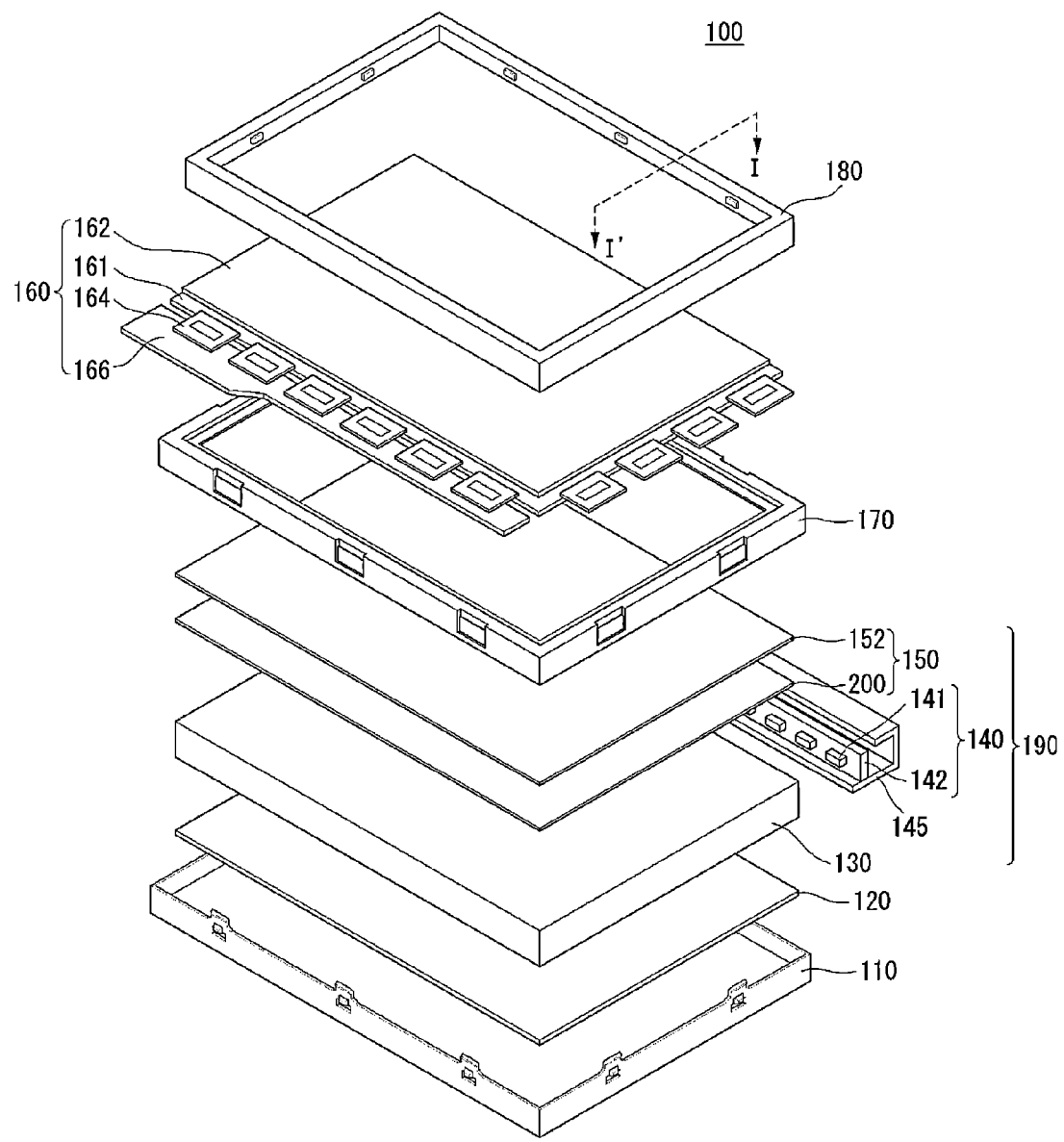
FIG. 2 is an exploded perspective view showing a display device according to an exemplary embodiment of the present invention.
Figure 3:
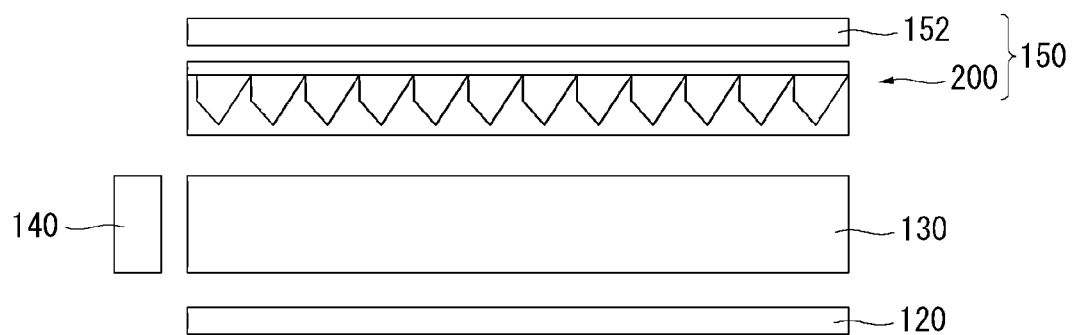
FIG. 3 is a cross-sectional view of a backlight unit taken along line I-I' of FIG. 2.

FIG. 2 is an exploded perspective view showing a display device according to an exemplary embodiment of the present invention. FIG. 3 is a cross-sectional view of a backlight unit taken along line I-I' of FIG. 2. A liquid crystal display device having a liquid crystal display panel will be described below as an example of the display device.

Referring to FIGS. 2 and 3, a liquid crystal display device 100 according to an exemplary embodiment of the present invention includes a cover bottom 110, a reflective plate 120 positioned on the cover bottom 110, a light guide plate 130 positioned on the reflective plate 120, a light source 140 positioned on the side of the light guide plate 130, an optical member 150 positioned on the light guide plate 130, a liquid crystal panel 160 positioned on the optical member 150, a panel guide 170 surrounding an edge of the liquid crystal panel 160, and a top cover 180 which surrounds the panel guide 170 and is fastened to the cover bottom 110. The reflective plate 120, the light guide plate 130, the light source 140, and the optical member 150 form a backlight unit 190. All the components of the liquid crystal display device 100 are operatively coupled and configured.

More particularly, the cover bottom 110 and the top cover 180 serve as a case of the liquid crystal display device 100. Thus, the cover bottom 110 and the top cover 180 may encase the liquid crystal panel 160 and the backlight unit 190. Since the cover bottom 110 has a rectangular plate shape and the top cover 180 has a rectangular frame shape, they may be fastened together. Although the display device 100 having a rectangular shape is shown, the display device 100 is not limited thereto and can have other shapes and/or configurations.

The light source 140 generates light towards the light guide 130. The reflective plate 120 positioned on the cover bottom 110 can reflect forward the light emitted from the light guide plate 130. Thus, the reflective plate 120 may be formed of a metal having an excellent or other proper reflectance. The light guide plate 130 positioned on the reflective plate 120 can guide the light emitted from the light source 140 and can change the received light from a line light source into a surface light source. In particular, the light guide plate 130 may be formed of a material having an excellent or other proper total reflectance, for example, polymethyl methacrylate (PMMA).

At least one light source 140 may be formed on one side of the light guide plate 130 along a long axis direction of the light guide plate 130. Alternatively, at least one light source 140 may be formed on each of the both sides of the light guide plate 130. That is, the light source 140 can be disposed at each of one or more sides of the light guide plate 130.

The light emitted from the light source 140 may be directly incident on the light guide plate 130. Alternatively, the light emitted from the light source 140 may be reflected on a light source housing 145 which surrounds a portion of the light source 140, for example, about ¾ of an outer circumference surface of the light source 140, and then may be incident on the light guide plate 130.

The light source 140 may be a light emitting diode (LED) assembly, and the LED assembly may include a plurality of LEDs 142 arranged on an LED printed circuit board (PCB) 141. A reflective plate may be positioned on the LED PCB 142 and may reflect the light emitted from the LEDs 142. In one example, the LEDs 142 may be blue LEDs emitting blue light or UV LEDs emitting ultraviolet light, or a combination thereof, or can be other types of LEDs. The present invention illustrates and describes the LEDs as the light source 140, but is not limited thereto. Various kinds of light sources such as a cold cathode fluorescent lamp (CCFL), an external electrode fluorescent lamp (EEFL), or a light emitting diode (LED) may be used as the light source 140.

The optical member 150 positioned on the light guide plate 130 serves to diffuse and/or focus the light emitted from the light guide plate 130. The optical member 150 preferably includes a focusing sheet 200 and a diffusion sheet 152. The diffusion sheet 200 may be at least a prism sheet, a microlens sheet, a lenticular sheet, or the like, and focuses light to improve luminance. The diffusion sheet 152 can diffuse the light incident on the diffusion sheet 152 to make the luminance of the light uniform.

The liquid crystal panel 160 positioned on the optical member 150 can display an image. The liquid crystal panel 160 may include a first substrate 161 and a second substrate 162, which are facing each other with a liquid crystal layer interposed therebetween and are attached to each other. A plurality of scan lines and a plurality of data lines may be arranged to cross each other in a matrix form on the first substrate 161, which sometimes is referred to as a thin film transistor (TFT) array substrate, thereby defining a plurality of pixels. Each pixel may include a thin film transistor (TFT) capable of turning on or off a signal and a pixel electrode connected to the TFT.

Red (G), green (G), and blue (B) color filters corresponding to each pixel and a black matrix surrounding these color filters and covering non-display elements such as scan lines, data lines, thin film transistors, etc. may be formed on the second substrate 162, which sometimes is referred to as a color filter substrate. Also, a transparent common electrode covering the red, green, and blue color filters and the black matrix may be formed. The liquid crystal display panel 160 can include other known components to operate properly.

A printed circuit board 166 is connected to at least one side of the liquid crystal panel 160 through a connection member 164, such as a flexible printed circuit board or a tape carrier package (TCP). Hence, the liquid crystal panel 160 may be disposed close to the side of the panel guide 170 or a bottom surface of the cover bottom 110 in a module process.

In the liquid crystal panel 160 having the above-described structure, when the TFT corresponding to each scan line is turned on in response to an ON or OFF signal supplied from a gate driving circuit through the scan lines, a data voltage of a data driving circuit is supplied to the corresponding pixel electrode through the data lines. Hence, an orientation direction of liquid crystal molecules changes by an electric field generated between the pixel electrode and the common electrode, and a transmittance difference may be generated.

The panel guide 170 surrounding the edges of the liquid crystal panel 160 can support the liquid crystal panel 160 as the liquid crystal panel 160 is situated on the panel guide 170. Accordingly, the liquid crystal display device 100 according to the embodiments of the present invention may be configured to incorporate the backlight unit 190 and the liquid crystal panel 160 therein.

Figure 4:
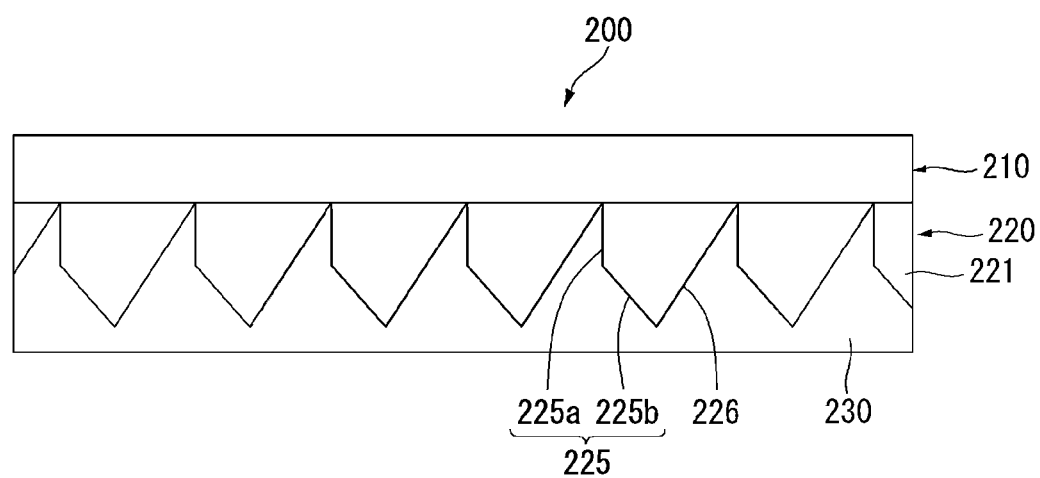
FIG. 4 is a view showing an enlarged view of an optical sheet in the backlight unit of FIG. 3 according to the exemplary embodiment of the present invention.
Figure 5:
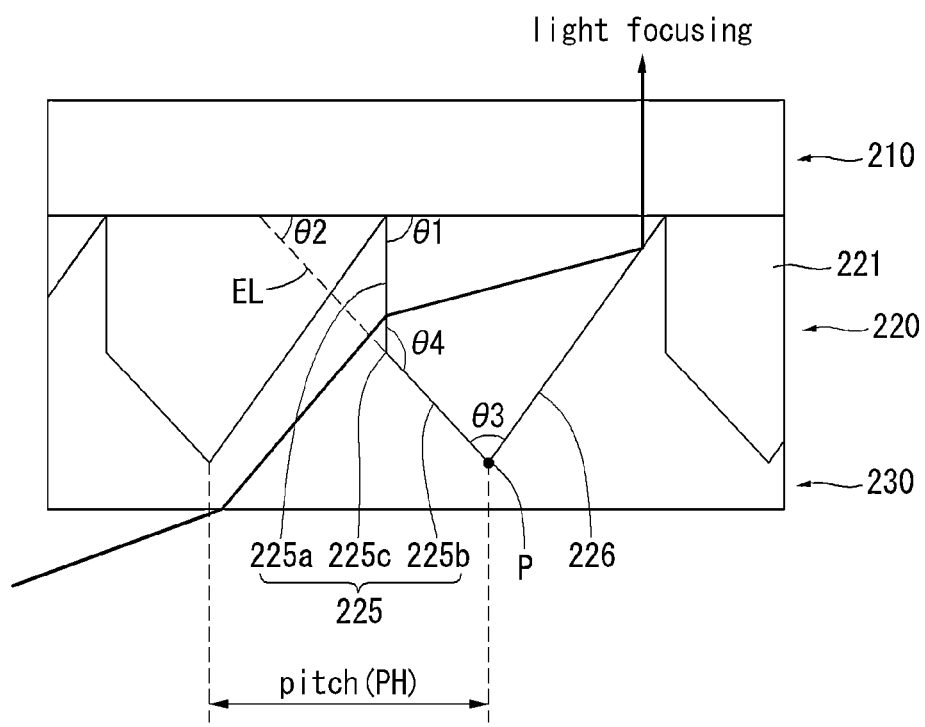
FIG. 5 is an enlarged view of a predetermined area of the optical sheet of FIG. 4.

FIG. 4 is a view showing an optical sheet according to the exemplary embodiment of the present invention. FIG. 5 is an enlarged view of a predetermined area of the optical sheet of FIG. 4. In the example of FIGS. 4 and 5, the optical sheet serves as the focusing sheet 200 of the optical member 150, which is one of the above-described optical members, and will be described below in detail.

Referring to FIG. 4 (from the upside down perspective), an optical sheet 200 according to an exemplary embodiment of the present invention includes a base film 210, a high refractive index layer 220 having a plurality of prism portions 221 on the base film 210, and a low refractive index layer 230 positioned on the high refractive index layer 220.

The base film 210 allows light incident through the light guide plate 130 to be transmitted therethrough. Thus, the base film 210 may be made of a transparent material. To this end, the base film 210 may be made of one selected from the group consisting of polyethylene terephthalate, polycarbonate, polypropylene, polyethylene, polystyrene, and polyepoxy.

The high refractive index layer 220 and the low refractive index layer 230 may be made of the same material or similar material as the base film 210 because it has to allow the light to be transmitted therethrough like the base film 200 does. On the other hand, the high refractive index layer 220 and the low refractive index layer 230 have different refractive indices. That is, the refractive index of the high refractive index layer 220 is higher than that of the low refractive index layer 230. For instance, preferably the high refractive index layer 220 has a refractive index of 1.4 to 2.0, and the low refractive index layer 230 has a refractive index of 1.3 to 1.9, where there is a refractive index difference between the set refractive indices of the high and low refractive index layers 220 and 230. Such a refractive index difference between the high refractive index layer 220 and the low refractive index layer 230 may be generated by adding different additives to them.

The base film 210 has a thickness of 50 μm to 300 μm. By applying UV curable resin on the base film 210 to form a pattern, prisms (221) with alternating peaks and valleys are formed in a mold as or as part of the high refractive index layer 220. The low refractive index layer 230 is formed by applying and filling UV curable resin having a lower refractive index than the high refractive index on the base film 210 having the high refractive index layer 220 thereon, and then curing the UV curable resin with UV rays. Accordingly, the optical sheet 200 is formed with the high refractive index layer 220 and the low refractive index layer 230 both formed on the base film 210.

In the optical sheet 200, the refractive index of the low refractive index layer 230 is lower than the refractive index of the high refractive index layer 220, and the refractive index of the low refractive index layer 230 is higher than the refractive index of air. Light emitted from the light guide plate 130 passes through an air layer having a refractive index of 1, and is incident on the low refractive index layer 230 and then is incident on the high refractive index layer 220 from the low refractive index layer 230. In other words, because the light emitted from the light guide plate 130 is incident sequentially onto a material having a lower refractive index (e.g., the low refractive index layer 230) and then onto a material having a higher refractive index (e.g., the high refractive index layer 220), the light can be focused more effectively through the optical optical sheet 200.

In this exemplary embodiment, the light focusing effect can be maximized by changing the light path by changing the shape of the prism portions 221 of the high refractive index layer 220.

Referring to FIG. 5, the prism portions 221 of the high refractive index layer 220 continuously extend linearly along the longitudinal direction of the prism portions 221. Accordingly, they may be formed like prism bars in appearance, but are not limited thereto.

The prism portions 221 of the high refractive index layer 220 each have an incidence surface 225 where light is incident and a refractive plane (or reflective surface) 226 where the incident light is reflected. In this example of the present invention, particularly, the incidence surface 225 is formed by being refracted or bent at a certain point (referred to herein as a bent point 225c) and is divided into first and second incidence surfaces 225a and 225b separated by the bent point 225c. More particularly, in this example, the incidence surface 225 includes the first incidence surface 225a located closer to the base film 210 relative to the bent point 225c, and the second incidence surface 225b connected to the vertex P at which the second incidence surface 225b and the reflective surface 226 meet.

The angle θ1 between the first incidence surface 225a and the surface of the base film 210 is less than or equal to 90 degrees, and exceeds the angle θ2 between an extended line EL extending from the vertex P to the second incidence surface 225b. If the first angle 51 between the first incidence surface 225a and the surface of the base film 210 is less than or equal to 90 degrees, this makes it easy to manufacture the prism portions 221 of the high refractive index layer 220. Also, if the first angle θ1 between the first incidence surface 225a and the surface of the base film 210 exceeds the angle θ2 between the extended line EL extending from the vertex P to the second incidence surface 225b, a pitch (PH) of two neighboring prism portions 221 is decreased, thus reducing loss of light that is not reflected on the reflective surface 225b. This allows more light to be directed to the liquid crystal panel 160.

Moreover, the third angle θ3 between the second incidence surface 225b and the reflective surface 226 is less than the fourth angle θ4 between the first incidence surface 225a and the second incidence surface 225b, thereby maintaining the shape of the prisms and focusing light more efficiently.

The light path shown in FIG. 5 will be discussed. Light emitted from the light guide plate 130 passes through an air layer having a refractive index of 1, and is refracted at the interface between the air layer and the low refractive index layer 230 and travels. The light incident on the low refractive index layer 230 is refracted at the low refractive index layer 230 and the first incidence surface 225a of the high refractive index layer 220. Then the light transmitted through the high refractive index layer 220 is reflected from the reflective surface 226, which is the interface between the high refractive index layer 220 and the low refractive index layer 230, and then vertically directed towards the liquid crystal panel 160 through the base film 210. Thus focused light will be supplied to the liquid crystal panel 160.

Figure 1:
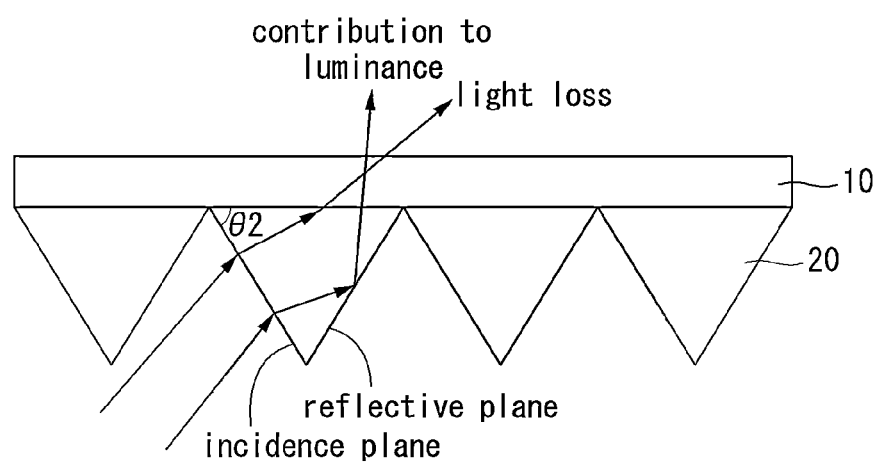
FIG. 1 is a view schematically showing the focusing of light incident on a prism sheet in a backlight unit of a liquid crystal display device according to a related art.

On the other hand, the incidence surface of prism portions according to the related art will be discussed referring to FIG. 1. In FIG. 1, light emitted from the light guide plate of the backlight unit may pass through an air layer having a refractive index of 1, and may be refracted at the interface between the air layer and a low refractive index layer (not shown) and travels. The light incident on the low refractive index layer may be refracted at the low refractive index layer and the incidence surface of the prism 20 and travels, but does not reach the reflective surface and may be transmitted through the base film 10 because the angle of refraction caused by the angle of inclination of the incidence surface is not large. Thus the light loss results in the related art as shown in FIG. 1

In contrast, the angle θ1 of inclination of the first incidence surface 225a of the high refractive index layer 220 of the present invention is larger than the angle θ2 of the incidence surface in the related art as shown in FIG. 1 (or the angle θ2 indicated by the dotted line in FIG. 5). Accordingly, the light that could not reach the reflective surface in the related art of FIG. 1 can now reach the reflective surface 226 according to the present invention by increasing the angle of light refraction at the incidence surface of the high refractive index layer 220. Also, because the first angle θ1 between the first incidence surface 225a and the base film 210 is made larger by refracting the incidence surface 225 of the high refractive index layer 220, the pitch PH between two adjacent prism portions 221 becomes smaller and therefore can reduce the light that is refracted at the incidence surface but does not reach the refractive plane. As such, the present invention allows more light to be directed towards the liquid crystal panel of the display device.

Hereinafter, a preferred example will be described for a better understanding of an embodiment of the present invention. It is to be understood, however, that the following example merely illustrates an embodiment of the present invention and is not meant to limit the present invention.

Example pf Present Invention

According to an example of the present invention, PET having a refractive index of 1.8 is coated on a PET base film to form a high refractive index layer (e.g., 220 in FIG. 5) in a mold. The vertex P of prisms is 50 degrees (e.g., θ3), the angle between a reflective surface (e.g., 226) and a base film (e.g., 210) is 65 degrees, the angle (e.g., θ1) between a first incidence surface (e.g., 225a) and the base film (e.g., 210) is 85 degrees, and the angle (e.g., θ4) between the first incidence surface and a second incidence surface (e.g., 225b) is 160 degrees. Next, PET having a refractive index of 1.6 is coated and cured on the high refractive index layer to form a low refractive index layer (e.g., 230).

Comparative Example ( Related Art)

Comparative Example according to the related art of FIG. 1 is performed under the same conditions as the above-described Example, except that the triangular prisms 20 of FIG. 1 whose incident planes were not refracted are formed and used. The vertex of the prisms 20 is 50 degrees, and the angle θ2 between the incidence surface and the base film 10 is 65 degrees.

Simulation Results

A simulation is conducted before actually manufacturing the optical sheets according to the above-described Example and Comparative Example. According to the simulation, the luminance at the same point is calculated and shown in the graph of FIG. 6, and an image of Comparative Example according to the related art is shown in FIG. 7a, and an image of Example according to the present invention is shown in FIG. 7b.

Figure 6:
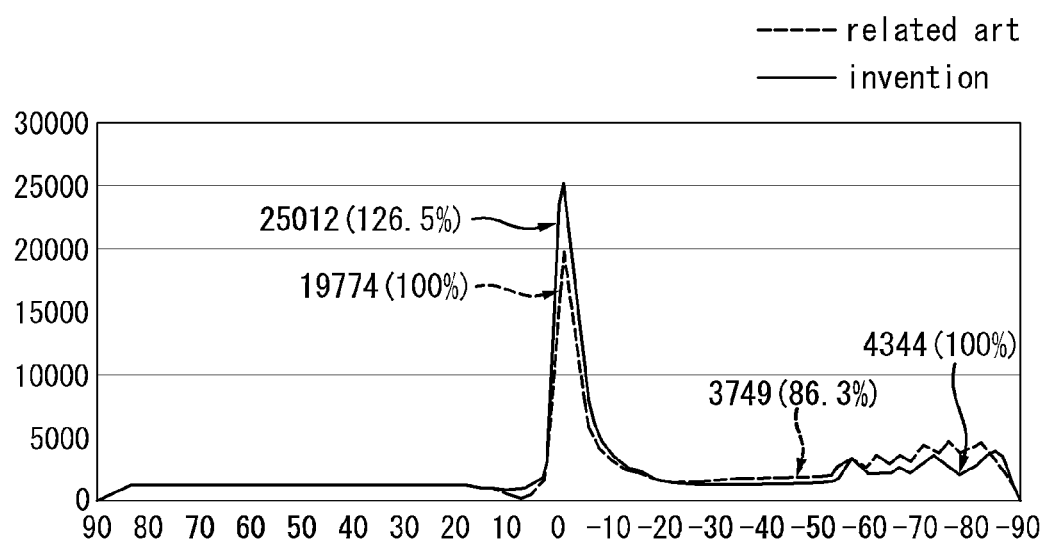
FIG. 6 is a graph showing examples of the measurements of luminance at the same point calculated in a simulation (before actually manufacturing the optical sheets) according to Example of the present invention and Comparative Example of the related art.
Figure 7A:
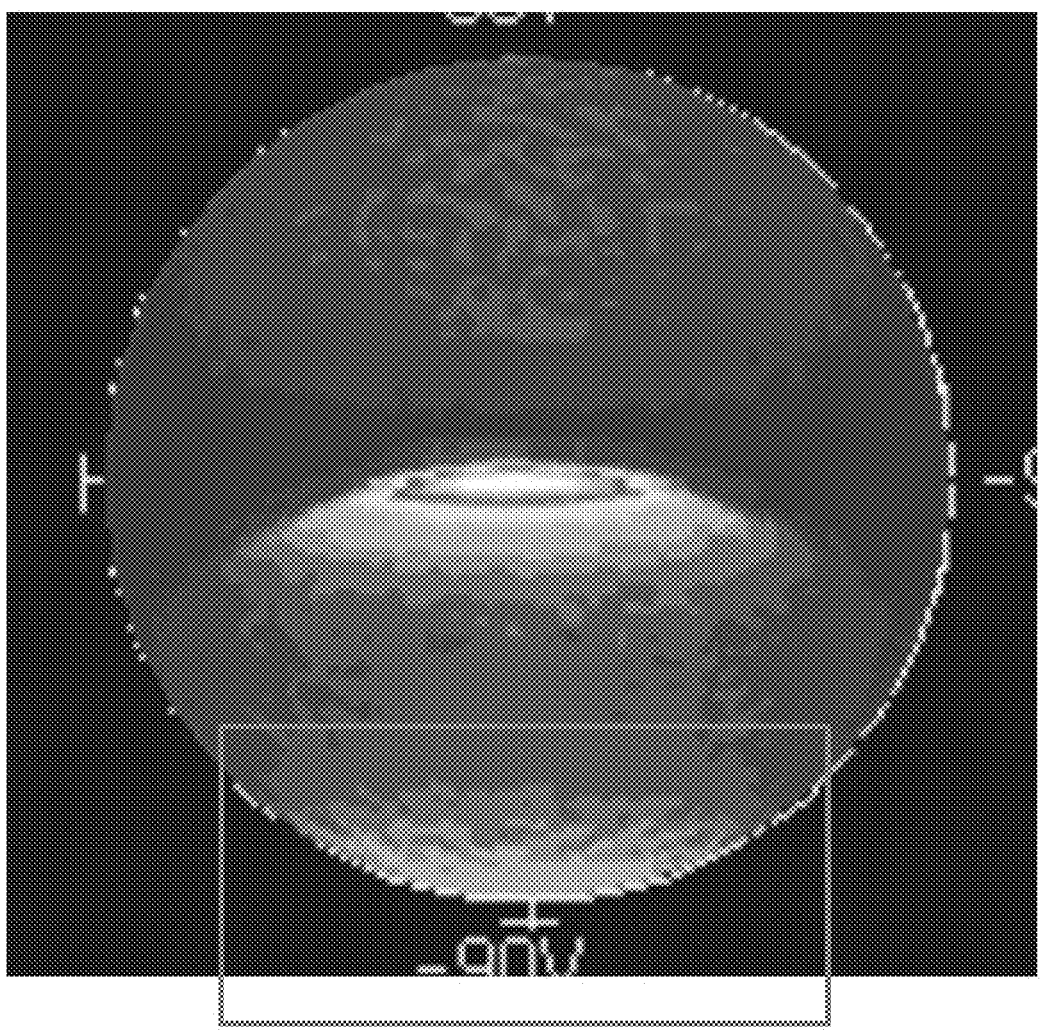
FIG. 7a is an image of one example of the measurement of luminance of the optical sheet according to a simulation of Comparative Example according to the related art.
Figure 7B:
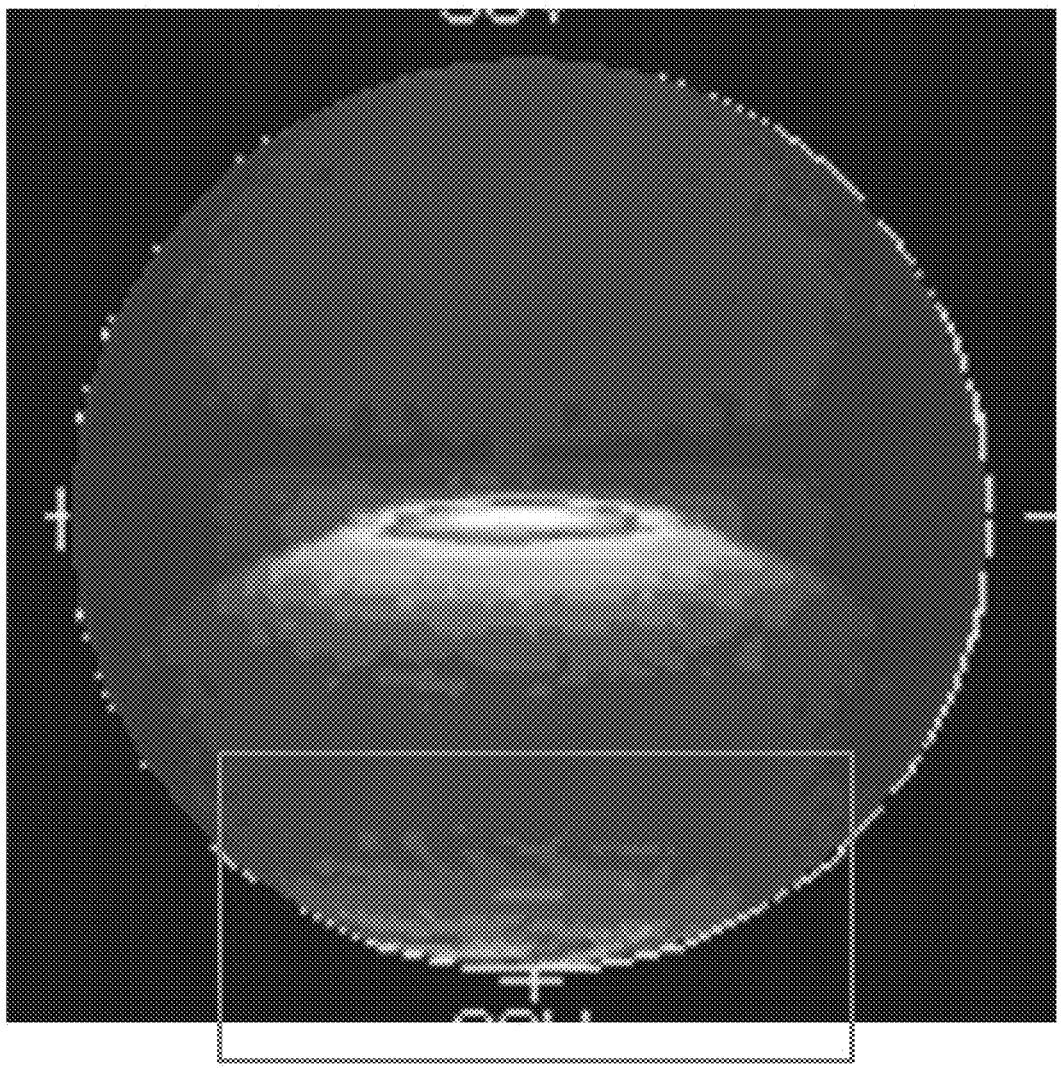
FIG. 7b is an image of one example of the measurement of luminance of the optical sheet according to a simulation of Example of the present invention.

Referring to FIGS. 6, 7a, and 7b, assuming that the optical sheet of Comparative Example of the related art has 100% luminance (see the dotted line in FIG. 6), the optical sheet of Example according to the present invention achieves 126.5% luminance in simulation (see the solid line in FIG. 6). That is, the luminance obtained by the optical sheet of the present invention is much better and higher than the luminance obtained by the optical sheet of the related art. Also, the optical sheet of Comparative Example in the related art shows much more light loss (as shown by the lighter color in the boxed area in FIG. 7a) because the luminance is measured at an outer edge of the optical sheet of Comparative Example according to the related art, whereas the luminance measured at an outer edge of the optical sheet of Example according to the present invention (as shown by the darker color in the boxed area in FIG. 7b) is much less than that of Comparative Example. Thus the comparison results indicate much better performance and less light loss when the optical sheet structure according to an example of the present invention is used in comparison with the optical sheet structure of the related art.

Results from Actually Manufactured Optical Sheets

Figure 8A:
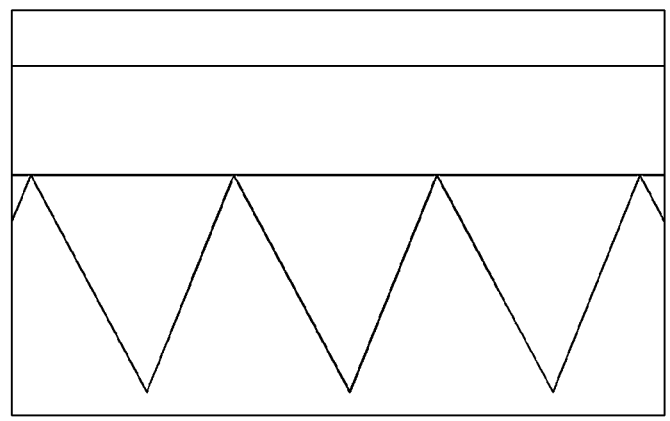
FIG. 8a is an image showing the shape of prisms made according to Comparative Example of the related art.
Figure 8B:
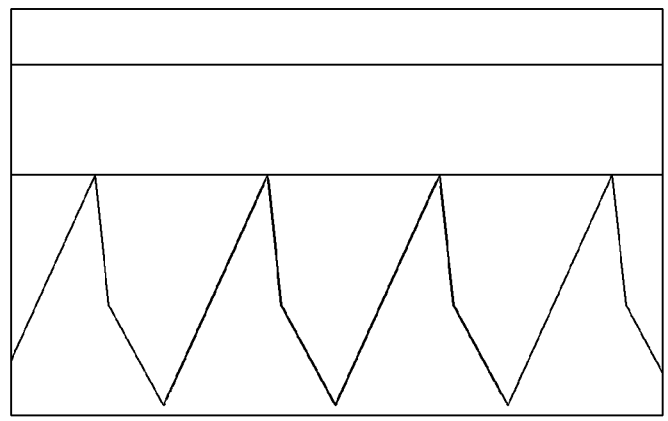
FIG. 8b is an image showing the shape of prisms made according to Example of the present invention.

After the simulation test above, the optical sheets are actually manufactured according to the above-described Example of the present invention and Comparative Example of the related art to test out the actual performance of these optical sheets. In this manufacture test, an image of the shape of prisms of Comparative Example of the related art is shown in FIG. 8a, and an image of the shape of prisms of Example of the present invention is shown in FIG. 8b. Also, the luminance at the same point on each of these optical sheets made according to Example and Comparative Example is measured and shown in the graph of FIG. 9, and an image of Comparative Example of the related art is shown in FIG. 10a and an image of Example of the present invention is shown in FIG. 10b.

Figure 9:
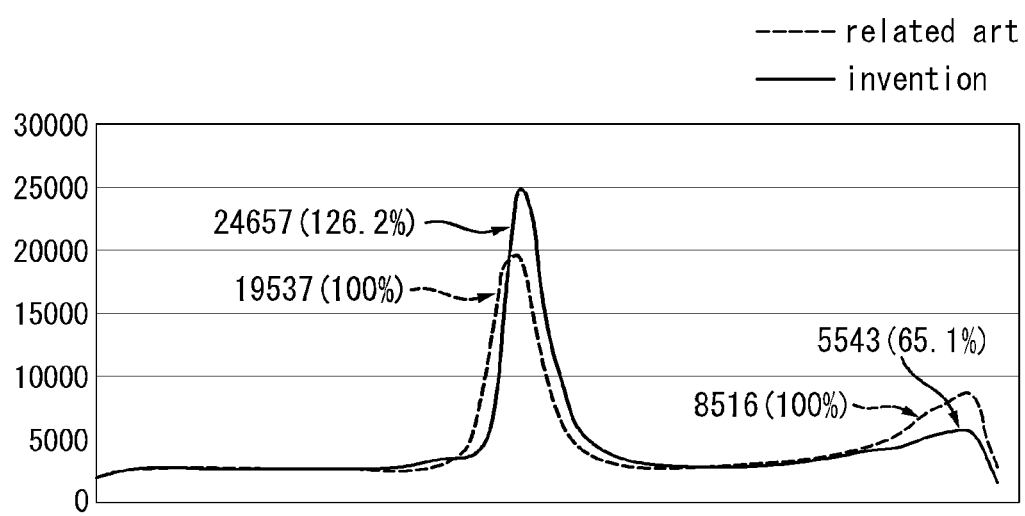
FIG. 9 is a graph which shows an example of the measurement of the luminance of the optical sheet made according to Example of the present invention, and an example of the measurement of the luminance of the optical sheet made according to Comparative Example of the related art.
Figure 10A:
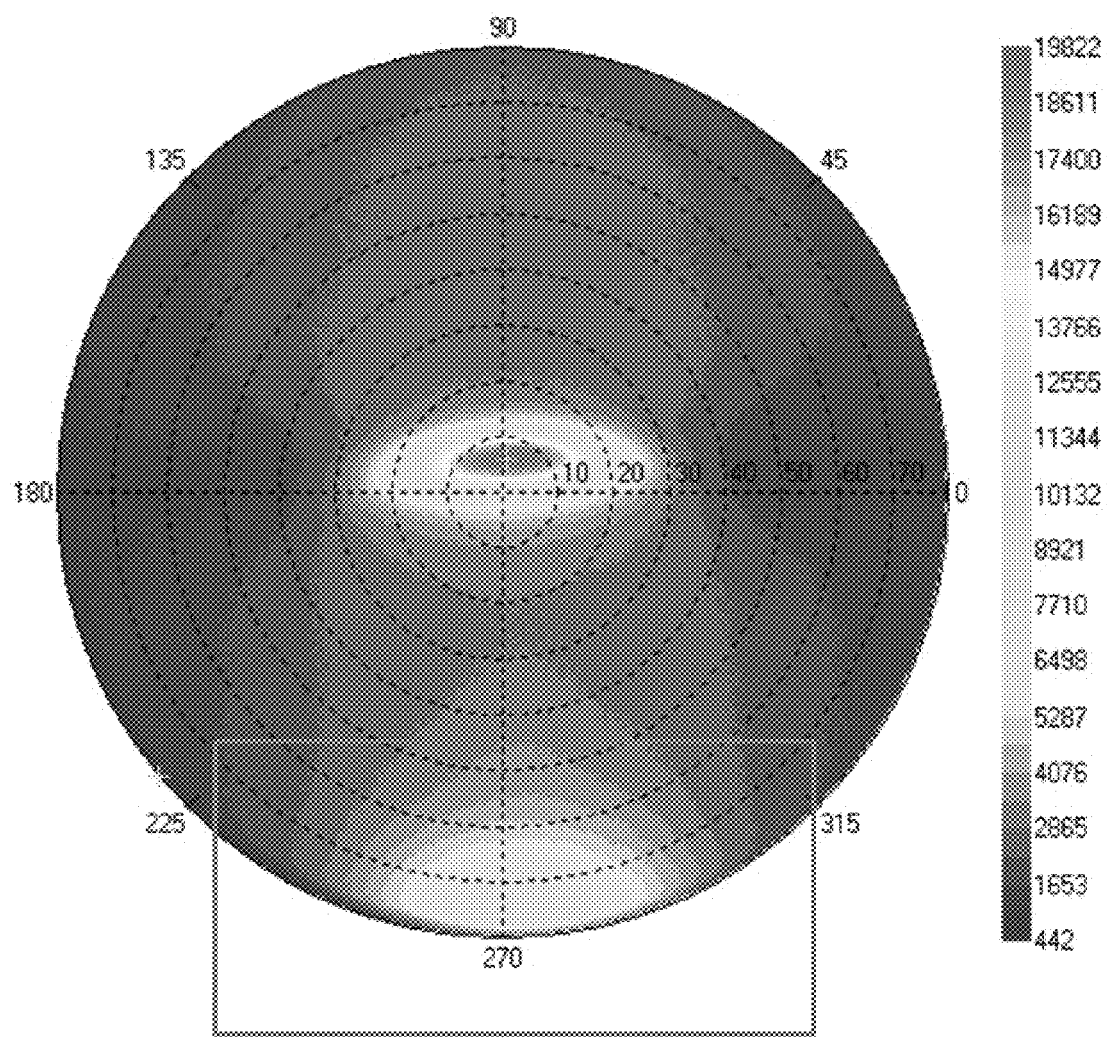
FIG. 10a is an image showing an example of the measurement of luminance of the optical sheet made made according to Comparative Example according to the related art.
Figure 10B:
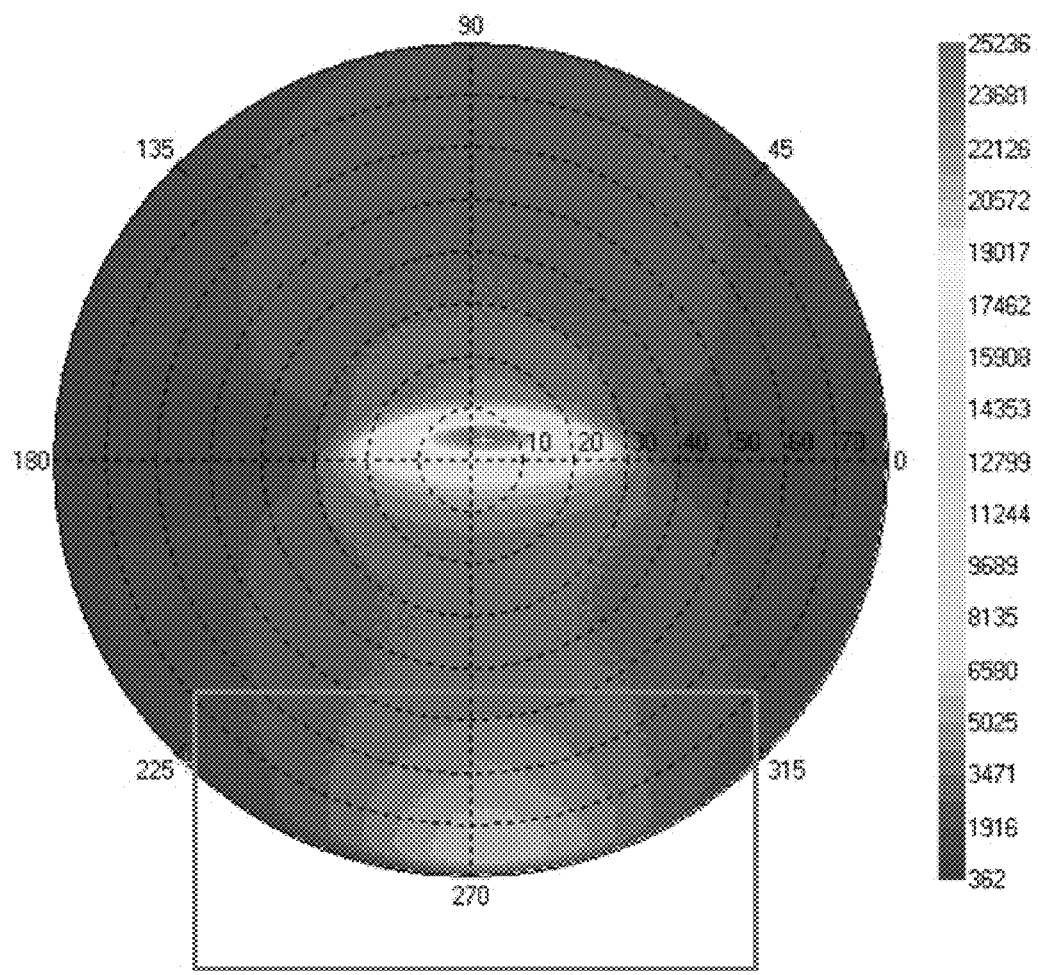
FIG. 10b is an image showing an example of the measurement of luminance of the optical sheet made made according to Example of the present invention.

Referring to FIGS. 9, 10a, and 10b, assuming that the manufactured optical sheet of Comparative Example in the related art generates 100% luminance (see the dotted line in FIG. 9), the optical sheet actually made according to Example of the present invention generates 126.2% luminance (see the solid line in FIG. 9), which is similar to the simulation results of FIG. 6. That is, the luminance obtained by the fabricated optical sheet of the present invention is much better and higher than the luminance obtained by the fabricated optical sheet of the related art. Also, although the optical sheet of Comparative Example in the related art shows light loss because the luminance is measured at an outer edge of the optical sheet of Comparative Example, the luminance measured at an outer edge of the optical sheet of Example in the present invention is much less than that of Comparative Example of the related art. Particularly, it is observed that more light loss appears in the optical sheet of Comparative Example that is actually manufactured than that of the simulation result for Comparative Example.

As seen from above, an optical sheet and a backlight unit and liquid crystal display device according to an exemplary embodiment of the present invention can reduce the pitch of prism portions, change the light path, and therefore reduce the loss of light emitted to the outside. The optical sheet according to an embodiment of the present invention cam provide such improved performance, by being composed of a high refractive index layer and a low refractive index layer and changing the shape of prisms of the high refractive index layer. Accordingly, this brings about the advantages of providing a liquid crystal display device which has excellent display quality by improving the luminance of the backlight unit.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical sheet comprising:
   a base film;
   a high refractive index layer having a plurality of prism portions on the base film; and
   a low refractive index layer positioned on the high refractive index layer, and covering the plurality of prism portions and having a surface parallel to the base film,
   each of the prism portions including an incidence surface on which incident light is refracted and a reflective surface on which the refracted light is reflected,
   the incidence surface including a bent for refracting the incident light towards the reflective surface,
   wherein the low refractive index layer includes a bottom surface having a refractive index difference at an interface between an air layer and the low refractive index layer, and
   wherein a portion of the low refractive index layer is disposed between the plurality of prism portions and the bottom surface, and the plurality of prism portions do not contact the bottom surface,
   wherein the plurality of prism portions continuously extend in one direction away from the base film and each of the plurality of prism portions includes an incidence surface configured to receive incident light and a refractive plane where the incident light passing through the incidence surface is reflected, and
   wherein an angle between the incidence surface of each the plurality of prism portions and a surface of the base film is equal to 90 degrees.

2. The optical sheet of claim 1, wherein the incidence surface includes:
   a first incidence sub-surface extending directly from the base film; and
   a second incidence sub-surface extending directly from the second incidence sub-surface to a vertex at which the incidence surface and the reflective surface meet,
   wherein the first and second incidence sub-surfaces form the bent.

3. The optical sheet of claim 2, wherein an angle between the first incidence sub-surface and a surface of the base film is less than or equal to 90 degrees.

4. The optical sheet of claim 2, wherein an angle between the second incidence sub-surface and the reflective surface is less an angle between the first incidence sub-surface and the second incidence sub-surface.

5. The optical sheet of claim 1, wherein an angle at the bent of the incidence surface is greater than 90 degrees, wherein the high refractive index layer is disposed between the base film and the low refractive index layer, and the low refractive index layer is disposed between the air layer and the high refractive index layer,
   wherein the high refractive index layer has a refractive index of 1.4 to 2.0, the low refractive index layer has a refractive index of 1.3 to 1.9, and the air layer has a refractive index of 1, and
   wherein the refractive index of the high refractive index layer is higher than the refractive index of the low refractive index layer.

6. The optical sheet of claim 1, wherein an angle formed by a portion of the incidence surface directly extending from the base film and a surface of the base film is substantially 90 degrees.

7. The optical sheet of claim 1, wherein the incidence surface includes first and second incidence sub-surfaces forming the bent, and
   wherein an angle formed by the first incidence sub-surface and a surface of the base film is greater than an angle formed by the surface of the base film and an extended line extending from the second incidence sub-surface.

8. A backlight unit comprising:
   a light source;
   a light guide plate positioned on a side of the light source;
   a reflective plate positioned under the light guide plate; and
   the optical sheet of claim 1, which is positioned on the light guide plate.

9. The backlight unit of claim 8, wherein in the optical sheet, the incidence surface includes:
   a first incidence sub-surface extending directly from the base film; and
   a second incidence sub-surface extending directly from the second incidence sub-surface to a vertex at which the incidence surface and the reflective surface meet,
   wherein the first and second incidence sub-surfaces form the bent.

10. The backlight unit of claim 9, wherein an angle between the first incidence sub-surface and a surface of the base film is less than or equal to 90 degrees.

11. The backlight unit of claim 9, wherein an angle between the second incidence sub-surface and the reflective surface is less an angle between the first incidence sub-surface and the second incidence sub-surface.

12. The backlight unit of claim 8, wherein in the optical sheet, an angle formed by a portion of the incidence surface directly extending from the base film and a surface of the base film is substantially 90 degrees.

13. The backlight unit of claim 8, wherein in the optical sheet, the incidence surface includes first and second incidence sub-surfaces forming the bent, and
   wherein an angle formed by the first incidence sub-surface and a surface of the base film is greater than an angle formed by the surface of the base film and an extended line extending from the second incidence sub-surface.

14. A liquid crystal display comprising:
   the backlight unit of claim 8; and
   a liquid crystal panel positioned above the backlight unit and configured to display images.

15. The liquid crystal display of claim 14, wherein in the optical sheet of the backlight unit, the incidence surface includes:
   a first incidence sub-surface extending directly from the base film; and a second incidence sub-surface extending directly from the second incidence sub-surface to a vertex at which the incidence surface and the reflective surface meet, wherein the first and second incidence sub-surfaces form the bent.

16. The liquid crystal display of claim 15, wherein an angle between the first incidence sub-surface and a surface of the base film is less than or equal to 90 degrees.

17. The liquid crystal display of claim 15, wherein an angle between the second incidence sub-surface and the reflective surface is less an angle between the first incidence sub-surface and the second incidence sub-surface.

18. The liquid crystal display of claim 14, wherein in the optical sheet of the backlight unit, an angle formed by a portion of the incidence surface directly extending from the base film and a surface of the base film is substantially 90 degrees.

19. The liquid crystal display of claim 14, wherein in the optical sheet of the backlight unit, the incidence surface includes first and second incidence sub-surfaces forming the bent, and wherein an angle formed by the first incidence sub-surface and a surface of the base film is greater than an angle formed by the surface of the base film and an extended line extending from the second incidence sub-surface.

* * * * *